Nov. 7, 1944.  L. P. HAIST  2,362,371
MECHANICAL FOWL OR POULTRY PICKER
Filed Sept. 4, 1942  2 Sheets-Sheet 1
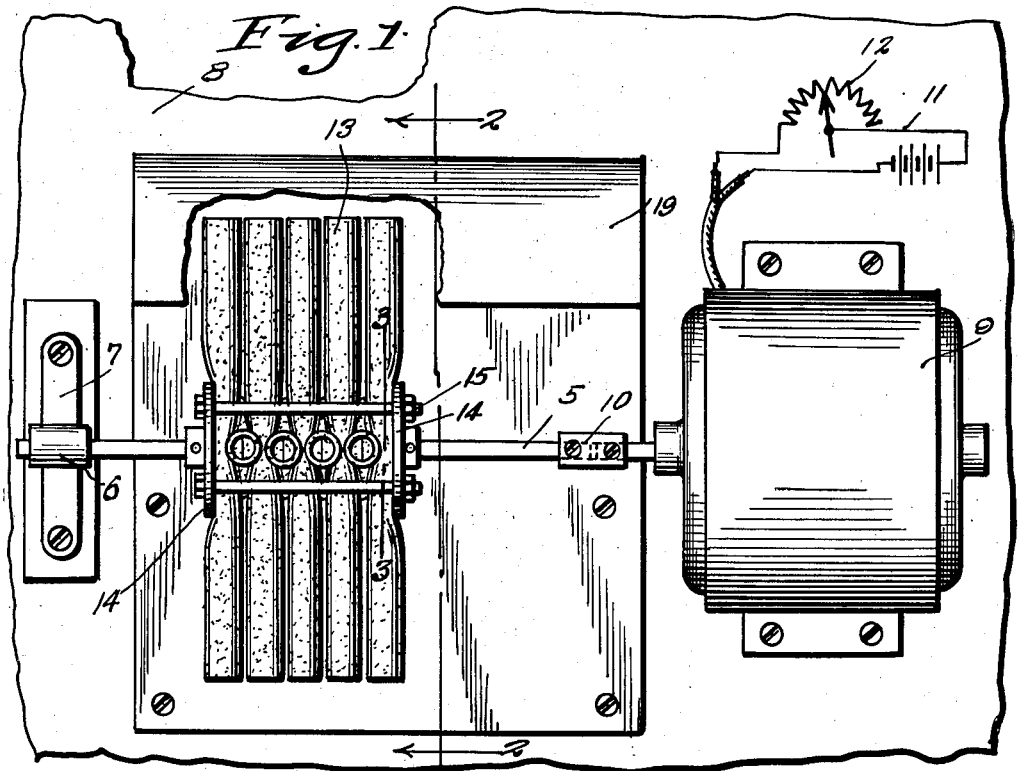
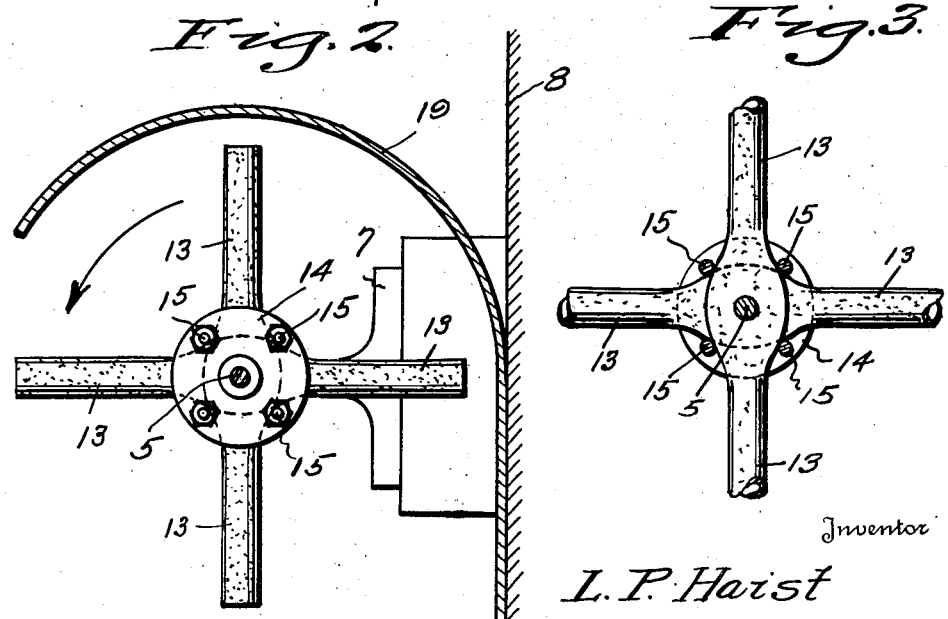
Inventor
L. P. Haist
By Clarence R. Gorman
Attorney

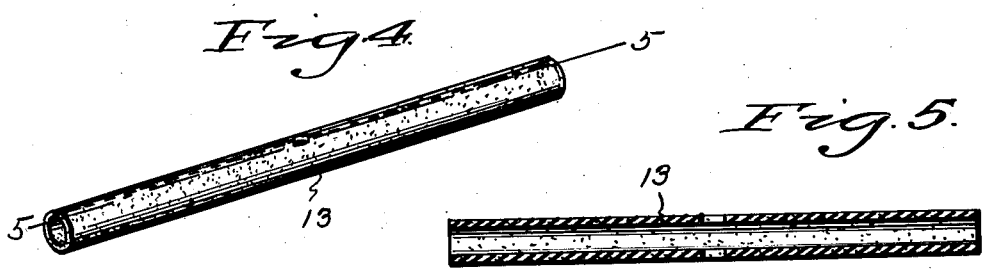
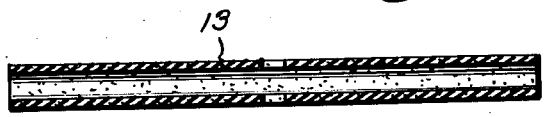
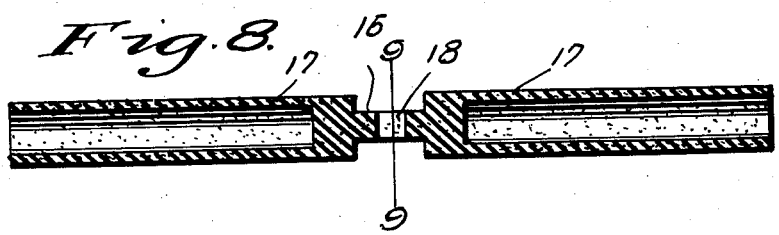
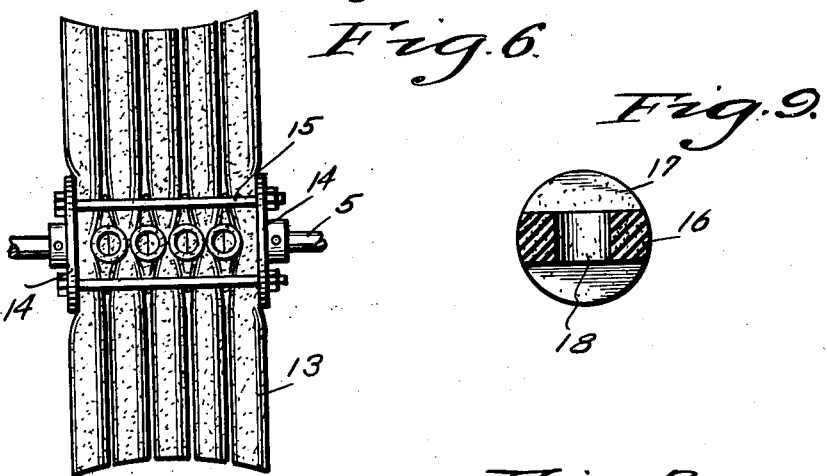
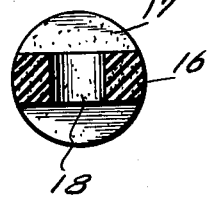
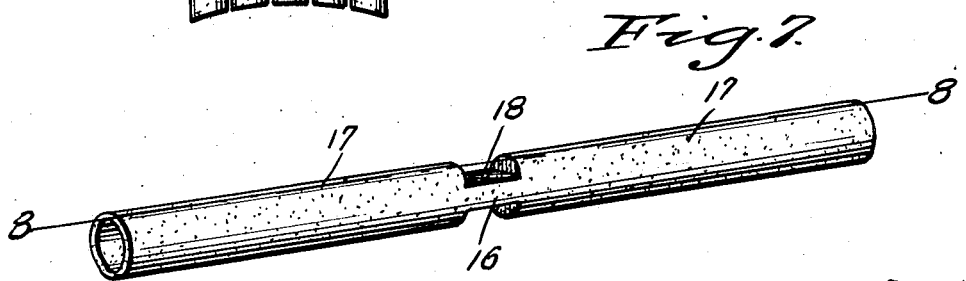

Patented Nov. 7, 1944

2,362,371

UNITED STATES PATENT OFFICE 2,362,371

MECHANICAL FOWL OR POULTRY PICKER

Louis Philip Haist, Trenton, N. J.

Application September 4, 1942, Serial No. 457,335

4 Claims. (Cl. 17—11.1)

This invention relates to a mechanical fowl or poultry picker and has for its primary object the provision of a device of the above stated character, which will quickly and efficiently remove all kinds of old and young feathers as well as pin feathers from a fowl regardless of the age of the fowl and texture of its skin without bruising or rupturing the skin.

Another object of this invention is the provision of a conveniently supported power driven picker medium in the form of a rotatable shaft, coupled to a prime mover which may have its speed varied, and groups of elongated flexible and elastic elements removably secured to said shaft with the elements of one group arranged at right angles to the elements of the other group and with the shaft extending through each element intermediate its ends. Thus the elements are positioned radially of the shaft for rotation in the direction of the operator, who supports the fowl for de-feathering, thereby permitting the operator to have a clear view of the fowl and the elements as the latter act on the feathers with a combined buffing and slapping action, and thereby permitting the operator to govern the action of the elements on the feathers, and in that way assure against injury to the skin of the fowl.

A further object of the invention is the provision of a device of the stated character which consists of a minimum number of parts, which may be easily and quickly assembled and installed for operation, and which will be durable, compact and efficient in the operation of de-feathering a fowl, and which may be manufactured and sold at a low cost rendering the device desirable by both large and small concerns engaged in de-feathering fowl of any kind for the market.

With these and other objects in view as will become more apparent as the description proceeds, the invention consists in certain novel features of construction, combination, and arrangements of parts as will be hereinafter more fully described and claimed.

For a complete understanding of my invention, reference is to be had to the following description and accompanying drawings in which Fig. 1 is a front elevation illustrating a mechanical fowl or poultry picker, constructed in accordance with my invention.

Fig. 2 is a transverse sectional view, taken on the line 2—2 of Fig. 1.

Fig. 3 is a fragmentary transverse sectional view taken approximately on line 3—3 of Fig. 1.

Fig. 4 is a perspective view illustrating one of the picker elements.

Fig. 5 is a longitudinal sectional view taken on line 5—5 of Fig. 4.

Fig. 6 is a fragmentary front elevation showing a modified grouping and the securing of the picker elements on the power shaft of the device.

Fig. 7 is a perspective view illustrating a modified form of picker element.

Fig. 8 is a sectional view, taken on the line 8—8 of Fig. 7.

Fig. 9 is a transverse sectional view taken on the line 9—9 of Fig. 8.

Referring in detail to the drawings, the numeral 5 indicates a shaft arranged horizontally and rotatably supported at one end by a bearing 6, which is equipped with attaching portions 7 to permit securing thereof to a wall or other support shown at 8. The other end of the shaft is detachably secured to a shaft of an electric motor 9 by a coupling 10. The motor is mounted on the wall or support 8, and its electric feed circuit 11 is equipped with a rheostat 12 for varying the speed of operation of the motor as well as the speed of rotation of the shaft and the elements 13 secured thereto. The rheostat is employed for stopping and starting the motor at the will of the operator.

The elements 13, which perform the picking action, are of elongated cylindrical formation, and contain a desired amount of flexibility and also elasticity. Said elements may be made from various materials having the stated qualities, so that when contacting feathers the said elements will have a combined buffing and slapping action thereon to efficiently extract the feathers from the skin of the fowl without danger of injuring the skin. The elements are apertured intermediate their ends to receive the shaft 5, and are arranged in groups as clearly shown in Figs. 1 and 2, so that the elements extend radially from the shaft and extend from opposite sides of said shaft. The groups of elements 13 are held in the stated grouped relation on the shaft by head plates 14, also located on the shaft. These head plates engage the end elements and tie rods 15, which connect said plates and pass longitudinally between the elements 13 and engage the latter close to where they are apertured to receive the shaft. Thus the major portion of said elements are free, as they engage the feathers, to create the slapping and buffing action heretofore referred to. The elements may be hollow or of solid formation, or may be constructed as shown in Figs. 7 and 8, which elements have a solid reduced medial portion 16 and an end tubular portion 17. The medial portion 16 is apertured as at 18 to receive the shaft.

As shown in Fig. 6, the elements 13 of each group may be varied as to length, so that when assembled, a concave curvature will be present at the ends of each group of elements.

A shield plate 19 is secured to the support 8, and said plate has a curved portion, which extends forwardly over the group of elements to shield the operator from feathers and water, which are thrown off during the picking of the fowl. The operator stands in front of the group of elements and supports the fowl while the elements rotate toward the operator, so that the feathers will be thrown downwardly toward the floor. Any feathers or water tending to follow the rotation of the elements will be stopped by the shield.

In operation, as before stated, the operator stands in front of the rotating elements 13 and holds the fowl in one or both hands. Thus he has a clear view of the area of the fowl as it is moved into the path of the end portions of said elements for receiving the buffing and slapping action, and thus he can readily control the force of action of the elements on the feathers. As the feathers are removed, he may decrease the action of the elements by slightly moving the fowl in a direction away from the elements, thereby permitting a lighter action to be had as the feathers become removed from the fowl, thus preventing damage to the skin of the fowl. This mode of operation and the construction of the machine permits the operator to successfully remove feathers regardless of texture and the tenderness and toughness of the skin on all kinds of fowl without bruising or otherwise defacing the fowl, so that its market value will not be impaired. Said mode of operation also permits a large number of fowl to be de-feathered within a short period of time.

While I have shown and described the preferred embodiment of my invention, it will be understood that minor changes in construction, combination and arrangement of parts may be made without departing from the spirit and scope of the invention as claimed.

Having thus described my invention, what I claim is:

1. In a de-feathering device, a power driven horizontally arranged shaft, means rotatably supporting said shaft, groups of elongated, flexible, cylindrical elements apertured intermediate the ends thereof to receive said shaft, and means securing the elements in groups with one group of elements arranged at substantially right angles to the other group of elements.

2. In a de-feathering device, a power driven horizontally arranged shaft, means rotatably supporting said shaft, groups of elongated flexible elements apertured to receive the shaft and extending radially therefrom and from opposite sides of the shaft, head plates secured to the shaft and engaging the groups of elements, and tie rods connecting said plates and extending between the free portions of said elements.

3. In a fowl de-feathering device, a rotatable shaft, means for rotating said shaft, and groups of flexible elongated elements mounted on said shaft, and each element including a medial portion apertured to receive the shaft and tubular end portions.

4. A de-feathering device comprising a rotatable shaft, a plurality of flexible elastic tubes engaged, approximately midway their ends, with the shaft, and means securing the tubes together on the shaft.

LOUIS PHILIP HAIST.